United States Patent
Semegn

(10) Patent No.: US 10,956,358 B2
(45) Date of Patent: Mar. 23, 2021

(54) COMPOSITE PIPELINE FRAMEWORK TO COMBINE MULTIPLE PROCESSORS

(71) Applicant: Microsoft Technology Licensing, LLC, Redmond, WA (US)

(72) Inventor: Assefa Dagne Semegn, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 250 days.

(21) Appl. No.: 15/819,733

(22) Filed: Nov. 21, 2017

(65) Prior Publication Data
US 2019/0155783 A1    May 23, 2019

(51) Int. Cl.
*G06F 9/50* (2006.01)
*G06F 15/76* (2006.01)
*G06F 8/34* (2018.01)

(52) U.S. Cl.
CPC ............. *G06F 15/76* (2013.01); *G06F 8/34* (2013.01); *G06F 9/5061* (2013.01)

(58) Field of Classification Search
CPC ..... G06F 9/5061; G06F 9/5077; G06F 15/825
See application file for complete search history.

(56) References Cited

U.S. PATENT DOCUMENTS

| | | | |
|---|---|---|---|
| 6,226,783 B1 | 5/2001 | Limondin et al. | |
| 7,752,172 B2* | 7/2010 | Boylan | G06F 9/466 707/648 |
| 2009/0013160 A1* | 1/2009 | Burger | G06F 9/3885 712/226 |
| 2009/0182979 A1* | 7/2009 | Farrell | G06F 9/30003 712/200 |
| 2010/0146209 A1* | 6/2010 | Burger | G06F 12/0813 711/120 |
| 2011/0093861 A1* | 4/2011 | Flemming | G06F 9/45516 718/104 |
| 2013/0113519 A1 | 5/2013 | Nowick et al. | |
| 2016/0357647 A1* | 12/2016 | Shirai | G06F 9/46 |
| 2017/0083313 A1* | 3/2017 | Sankaralingam | G06F 15/7867 |
| 2017/0083334 A1* | 3/2017 | Burger | G06F 9/3004 |
| 2017/0228253 A1 | 8/2017 | Layman et al. | |

OTHER PUBLICATIONS

Changkyu Kim, Simha Sethumadhavan, M.S. Govindan, Nitya Ranganathan, Divya Gulati, Doug Burger, Stephen W. Keckler. "Composable Lightweight Processors" 40th Annual IEEE/ACM International Symposium on Microarchitecture (MICRO 2007) (Year: 2007).*

"International Search Report and Written Opinion Issued in PCT Application No. PCT/US2018/060869", dated Feb. 15, 2019, 11 Pages.

* cited by examiner

*Primary Examiner* — Jacob Petranek
(74) *Attorney, Agent, or Firm* — Dicke, Billig & Czaja, PLLC

(57) ABSTRACT

A software framework is disclosed. The framework defines a system of a plurality of independent processors including compatible processors. A composite processor is created from the compatible processors.

20 Claims, 3 Drawing Sheets

COMPOSITE PIPELINE FRAMEWORK TO COMBINE MULTIPLE PROCESSORS

BACKGROUND

A software framework provides a generic functionality that can be selectively changed by additional user-written code to create application-specific software. In one example, a software framework is a universal, reusable software environment that provides particular functionality as part of a larger software platform to facilitate development of software applications, products and solutions. Software frameworks may include support programs, compilers, code libraries, tool sets, and application programming interfaces (APIs) that bring together all the different components to enable development of a project or system. In one example, a framework, unlike in libraries or standard user applications, dictates the overall program's flow of control, rather than a caller dictating flow. Software frameworks can facilitate software development by allowing designers and programmers to devote their time to meeting software requirements rather than dealing with the more standard low-level details of providing a working system, thereby reducing overall development time. A framework can include a broad software development platforms and also a framework within a larger programming environment.

SUMMARY

This summary is provided to introduce a selection of concepts in a simplified form that are further described below in the Description. This summary is not intended to identify key features or essential features of the claimed subject matter, nor is it intended to be used to limit the scope of the claimed subject matter.

A composite pipeline framework having of a cooperative collection of interfaces and classes to be used for creating systems is described. The framework defines a system of a plurality of independent processors including compatible processors. A composite processor is created from the compatible processors. In one example, the composite pipeline framework can be applied to queuing systems in particular or to producer-consumer systems in general.

The composite pipeline framework can be used to create highly scalable and composable systems in a range of scales from a light weight and standalone executable that can run as part of a build system or a desktop application to a network of cloud-based, loosely-coupled services such as micro-services. Systems can be deployed in multiple sets or subsets to create advanced and complex systems from a dynamic composition of a set of relatively simple components and as massively parallel execution of distributed processes in distributed way, enabling the micro-service based architecture of scalable cloud services.

In the framework, a system can be presented as a composite set of software processors that are connected to each other via input-output connectors and transform an input type to an output type. The connectors and the processors are configured as separate items and can dynamically be attached and detached to allow a reconfiguration of the system. By implementing two classes of connectors having the same interface, one working as an in-memory connector or queue, and another class, a such as a cloud based connector or service bus, the processors can be made to communicate within a single process space or across different machine boundaries, including connecting services running on-premise computers to those running in the cloud, enabling hybrid cloud services.

The framework can include three types of processors. A first type of processor, or simply a processor, includes a single input connector and a single output connector. A second type of processor, or multiplexer, includes inputs from multiple connectors and output to a single output connector. A third type of processor, or demultiplexer, includes a single input connector and provides output to multiple output connectors. The base class of processors, without the input-output connectors, is a transformer, and can accept jobs that transform an input from one generic type to another generic type. A transformer extends an engine, which controls the execution of processes.

Processors can be connected to each other by coupling an output connector of a first processor to the input connector of a second processor. Additionally, processors can be connected to each other if they include similar multiplicity of input and output connectors. For example, single output connector processor can connect to a single input processor. A multiple output connector processor, such as a demultiplexer, may be connected to a multiple input connector processor, such as a multiplexer, or a set of single input connector processors. A composite processor is provided from connecting together multiple compatible processors, which can include an interface as one of the three types of processors. For instance if a first processor transforms from inputs of a first type to an output of a second type, and second processor transforms an input of the second type to an output of a third type, then the first processor can be appended to the second processor to create a third processor Processor3, i.e. Processor3=Processor1.Append(Processor2), which itself is a processor that can transform inputs of the first type to outputs of the third type. In one example, the composite processor, or third processor in the example, does not expose the intermediate second type. The composite processor can further be cascaded with another composite processor to create an even more powerful composite processor.

BRIEF DESCRIPTION OF THE DRAWINGS

The accompanying drawings are included to provide a further understanding of embodiments and are incorporated in and constitute a part of this disclosure. The drawings illustrate embodiments and together with the description serve to explain principles of embodiments. Other embodiments and many of the intended advantages of embodiments will be readily appreciated, as they become better understood by reference to the following description. The elements of the drawings are not necessarily to scale relative to each other. Like reference numerals designate corresponding similar parts.

DESCRIPTION

In the following Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following description, therefore, is not to be taken in a limiting sense. It is to be understood that features of the various example embodiments described herein may be combined, in part or whole, with each other, unless specifically noted otherwise.

Figure 1:
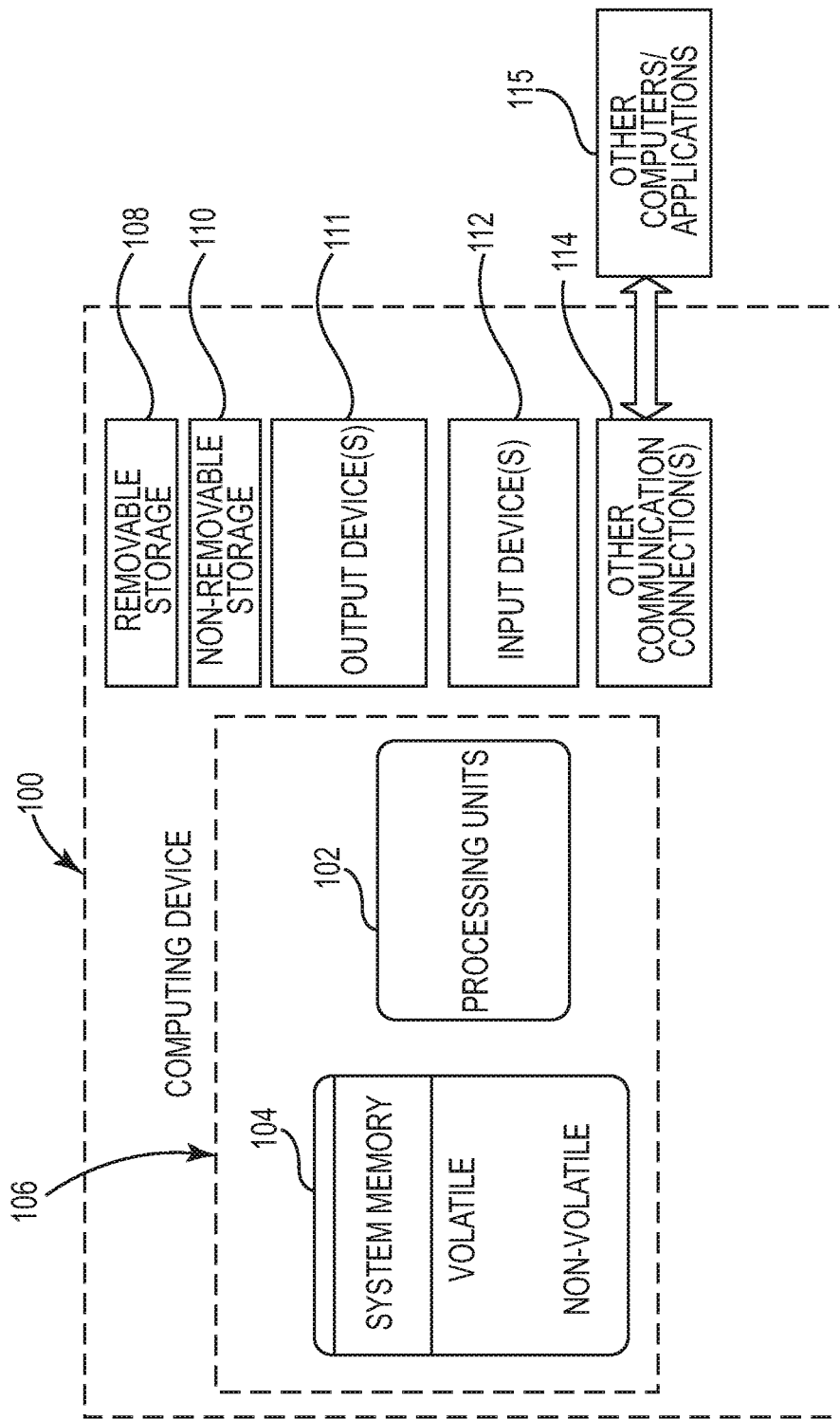
FIG. 1 is a block diagram illustrating an example of a computing device, which can be configured as a stand-alone device or in a computer network to provide, for example, a cloud-computing environment.

FIG. 1 illustrates an exemplary computer system that can be employed in an operating environment and used to host or run a computer application included on one or more computer readable storage mediums storing computer executable instructions for controlling the computer system, such as a computing device, to perform a process. An example of a computer-implemented process includes a composite pipeline framework that can be stored in a computer memory and executed with a processor.

The exemplary computer system includes a computing device, such as computing device 100. In a basic hardware configuration, computing device 100 typically includes a processor system having one or more hardware processing units, i.e., hardware processors 102, and memory 104. By way of example, the processing units may include two or more hardware processing cores on a chip or two or more hardware processor chips. In some examples, the computing device can also have one or more additional hardware processing or specialized hardware processors (not shown), such as a graphics processor for general-purpose computing on graphics processor units, to perform processing functions offloaded from the hardware processor 102. The memory 104 may be arranged in a hierarchy and may include one or more levels of cache. Depending on the configuration and type of computing device, memory 104 may be volatile (such as random access memory (RAM)), nonvolatile (such as read only memory (ROM), flash memory, etc.), or some combination of the two. The computing device 100 can take one or more of several forms. Such forms include a tablet, a personal computer, a workstation, a server, a handheld device, a consumer electronic device (such as a video game console or a digital video recorder), or other, and can be a stand-alone device or configured as part of a computer network.

Computing device 100 can also have additional features or functionality. For example, computing device 100 may also include additional storage. Such storage may be removable and/or non-removable and can include magnetic or optical disks, solid-state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other storage medium that can be used to store the desired information and that can be accessed by computing device 100. Accordingly, a propagating signal by itself does not qualify as storage media. Any such computer storage media may be part of computing device 100.

Computing device 100 often includes one or more input and/or output connections, such as USB connections, display ports, proprietary connections, and others to connect to various devices to provide inputs and outputs to the computing device. Input devices 112 may include devices such as keyboard, pointing device (e.g., mouse, track pad), stylus, voice input device, touch input device (e.g., touchscreen), or other. Output devices 111 may include devices such as a display, speakers, printer, or the like.

Computing device 100 often includes one or more communication connections 114 that allow computing device 100 to communicate with other computers/applications 115. Example communication connections can include an Ethernet interface, a wireless interface, a bus interface, a storage area network interface, and a proprietary interface. The communication connections can be used to couple the computing device 100 to a computer network, which can be classified according to a wide variety of characteristics such as topology, connection method, and scale. A network is a collection of computing devices and possibly other devices interconnected by communications channels that facilitate communications and allows sharing of resources and information among interconnected devices. Examples of computer networks include a local area network, a wide area network, the Internet, or other network.

The present disclosure relates generally to frameworks and methods to create systems for a pipeline flow pattern with programming languages in a data processing system such as computing device 100. Aspects of the present disclosure may be embodied as a system, method or computer program product. Accordingly, aspects of the present disclosure may take the form of entirely hardware, entirely software, including firmware, resident software, micro-code, or a combination of software and hardware aspects that may all generally be referred to as a system. Furthermore, aspects of the present disclosure may take the form of a computer program product including one or more computer readable medium or media having computer readable program instruction for causing a processor to carry out the aspects of the disclosure.

Figure 2:
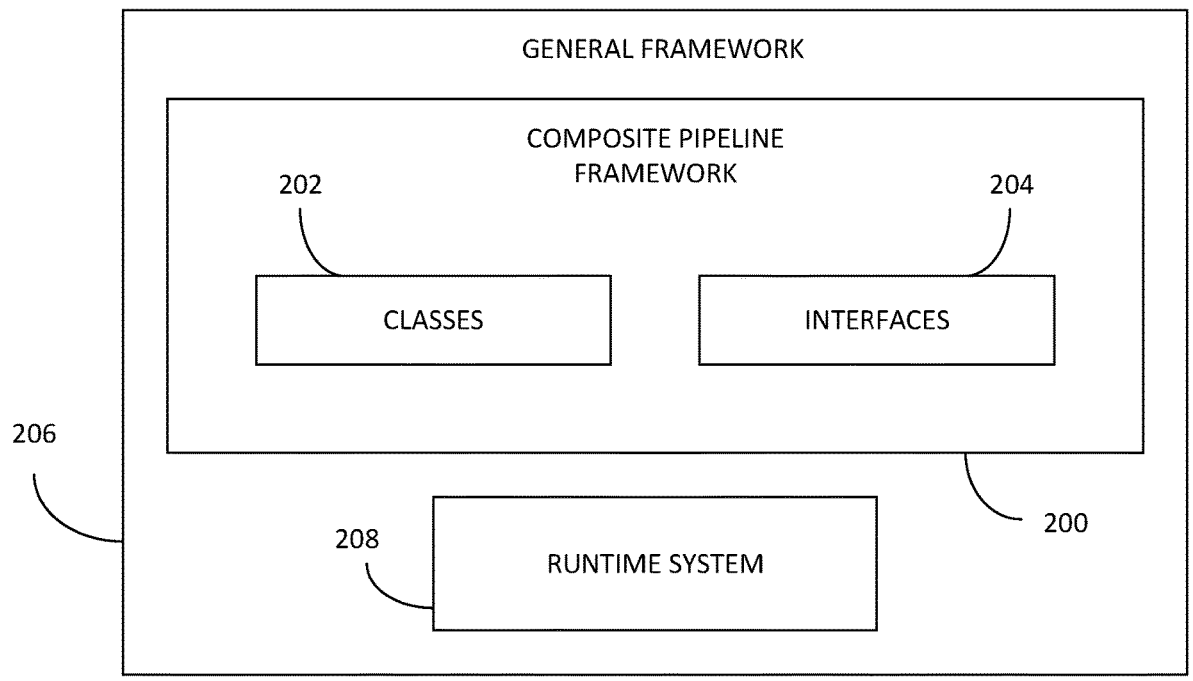
FIG. 2 is a block diagram illustrating an example application framework for execution in the computing device of FIG. 1.

FIG. 2 illustrates features of an example software composite pipeline framework 200 providing a functionality that can be selectively changed with additional developer-written code, such as managed code, which can be implemented on computing device 100. The composite pipeline framework 200 can be used with developer-written software applications created in one or more framework-compatible languages for one or more platforms. In the example, the framework 200 can include a class library 202 includes a set of classes organized by namespace to define features available in a framework-compatible programming language. A class or a struct are basic data structures that encapsulate a set of data and behaviors together as a logical unit. The framework 200 can also have interfaces 204, which include definitions for a group of related functionalities that a class or struct can implement, such as to include behavior from multiple sources in a class. A class or struct can implement multiple interfaces. Interfaces can include methods, properties, events, indexers, or any combination of methods, properties, events, and indexers. In one example, software applications written in a framework-compatible language as source code in the framework can be incorporated within or layered within another framework, such as a general domain framework 206.

An example of a general domain framework 206 is available under the trade designation .NET from Microsoft Corporation of Redmond, Wash. In one example, framework 206 can includes a runtime library and class library and an application engine such as a runtime system 208 or virtual machine. In one example, software applications written in a framework-compatible language as source code in the framework to run in are compiled into a platform-neutral language, or bytecode, that can be executed in a platform-specific virtual machine installed on the platform, such as computing device 100. The runtime system 208 can compile the bytecode into machine code that is executed on the platform. Upon execution of the developer-written program, a platform-specific just-in-time compiler of the runtime system 208 translates the byte code into machine code. The compiler can provide a combination of ahead-of-time compilation and interpretation, and the runtime system 208 can handle late-bound data types and enforce security guarantees. The runtime system 208 can provides additional services including memory management, type safety, exception handling, garbage collection, security and thread management.

In general, a class in the composite pipeline framework 200 is an extensible program-code-template, or blueprint, for creating objects, providing initial values for state, and implementations of behavior. The class is a construct that enables a developer to create custom types by grouping together variables of other types, methods and events. Class or classes may include class variables, instance variables, local variables, parameters, user-defined methods, inherited states and behaviors, and interfaces. The variable remains in memory 104 until all references go out of scope. At that time, the runtime system 208 via a garbage collector marks the variable as eligible for garbage collection.

Data streams and workflow systems are common technologies that can be used to implement flow patterns in, for example, a general domain framework 206. Data streams are used to allow the flow of data from sources to various destinations such as files, networks, memory, and databases. Data streams can be designed to transport of data from its source to destination but typically does not provide a transformation or processing of the data during transport. Workflow systems are designed to create systems from a connected set of activities. The activities represent executions or transformations. When or whether an activity is executed is determined by which activities it is connected to or the state of the activities it is connected to. An example of a workflow system is available under the trade designation of Windows Workflow Foundation from Microsoft Corporation. An example workflow system can include sequential, state machine, and data-driven activities. Sequential workflows include a set of contained activities that are executed in sequential order until the last activity finishes. State-machine workflows include a set of contained activities that represent specific states, and transitions between states are determine from events. The data-driven workflows are executed in an order determined from conditional expressions. Workflow systems can thus be considered as flow systems where what flows in the system may be the transformation or state itself.

The composite pipeline framework 200 is distinguishable from data streams and workflow systems, in one example, as it can provide a connected set of pipelines to pass entities, such as data and active items, that will be transformed en route. The transformers of the composite pipeline framework 200 are included as part of the pipeline system. Unlike the workflow systems, however, the pipes of the composite pipeline framework 200, for example, do not influence each other's state but work in parallel communication through shared connectors. In this pattern, we view a system as a composite set of processors (one or more) that are connected to each other through their input-output connectors and transform a given type to another type. In this disclosure, the "processors" of the framework 200, such as software processors, are distinguishable from the hardware "processors" of the computing device 100. The composites coordinate their transformation of the entities they pass through the pipeline through the producer-consumer problem.

Figure 3:
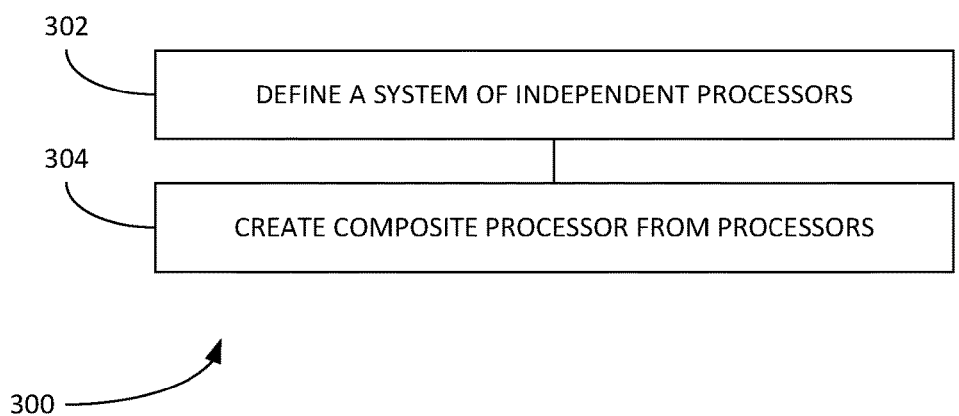
FIG. 3 is a block diagram illustrating an example method of the application framework of FIG. 2.

FIG. 3 illustrates an example method 300 of the composite pipeline framework 200. The method 300 defines a system of a network of a plurality of processors having connectors in which the processors are independent of each other at 302. In one example, a processor of the plurality of processors includes a composition of an input connector, a transformation job, a state controlling engine, and an output connector. The processor can include a composition of a plurality of input connectors, transformation jobs, state controlling engines, or output connectors. The method creates a composite processor from a plurality of compatible processors at 304. The composite processor includes an interface similar to a processor, and is itself composable. The framework 200 provides the mechanisms of coordination among the plurality of processors in a composite processor. The example method 300 can be implemented to include a combination of one or more hardware devices and computer programs for controlling a system, such as a computing device 100 having a hardware processor and memory, to perform method 300.

In this method 300, the framework 200 can be applied to various platforms and modes from lightweight, performant executable client tools to scalable network services, such as cloud services. The modes can include a single basic unit processor with one input and one output to one that accepts multiple inputs and provides a single output or accepts a single input and provides multiple outputs. Processors are also composable via cascading multiple processors together and transforming types. In making a composition of a first processor with a second processor, the output connector of the first processor is couplable to the input connector of the second processor if the first processor outputs an intermediate type acceptable as an input to the second processor. Processors and composite processors are configured to receive from other processors and composite processors compatible with the input type.

Figure 4:
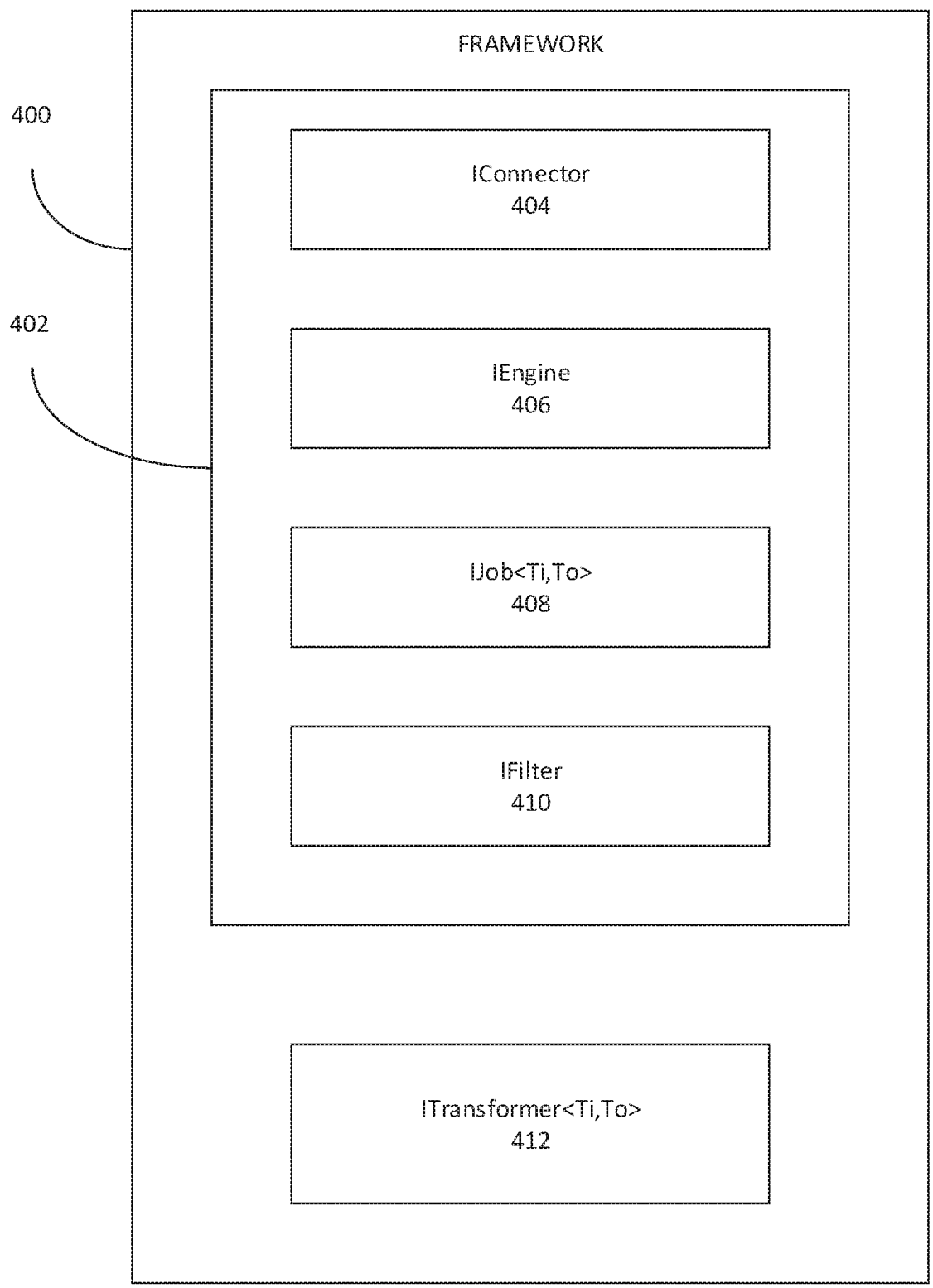
FIG. 4 is a block diagram illustrating an example application framework of FIG. 2 to provide the method of FIG. 3.

FIG. 4 illustrates an example framework 400 to perform method 300. To simplify the creation of diverse types of processes and composites and to allow instantiation of objects from various sources, the framework 400 can include factory interfaces that may be implemented by different factory classes. Classes can include a class for creating connectors and a class for creating processors. Framework 400 includes a set of composable components, or building blocks 402, of elementary types for defining a system at 302. The building blocks 402 may be modified dynamically to adapt the system for a particular environment, a data source, or capability. Example building blocks 402 include Q:IConnector 404, E:IEngine 406, A:IJob<Ti, To> 408, and F:IFilter 410. The elementary types, or building blocks 402, can be used to create various types of composites. A common base for the components includes an T:ITransformer<Ti,To> 412, which can include an abstract interface created from a building block 402.

The IConnector 404 is a component to couple together composites of the system. For example, the IConnector 404 transports inputs and outputs of processors. In an example of a distributed system, the IConnector 404 transports inputs and outputs across computing entities or entity boundaries.

The IEngine 406 provides an active processing unit. In one example, the IEngine 406 includes an IActionExecutor to perform, or run, the actions, a state machine that accepts state transition inputs, and a link to another component to communicate state transitions to the component. In one example, the state transitions can undergo a new/stopped, active, and suspended state. The new transitions to the active state via a start method, and the active state transitions to the suspended state via a suspend method. The suspended state transitions to the active state via a resume method and the active state transitions to the stopped state via a stop method. In one example, the IEngine 406 interface is the basis for IProcessor through ITransformer 412 to control the execution of the processors with the Start, Stop, Suspend, and Resume methods. The IEngine interface defines the state of a service and the action that it receives to change the state. In one example, the actions can include a Stop for a blocking thread until finished and a StopAsync to finish without blocking the calling thread.

The IJob<Ti,To> 408 represents a transfer function, such as f(x), to convert objects of an input type Ti to an output type To. In one example, the IJob<Ti,To> 408 can include a generic type transformer from an input type (Ti) to an output type (To). In one example, the IJob interface is implemented by user components to make use of the composite pipeline framework 400. The IJob interface can be used to define a action that transforms one or more inputs of type Ti to zero or more outputs of type To and performs the action to provide the output or outputs of type To from the input or inputs of type Ti.

The I;Filter 410 represents a function expression that maps objects of a given type to a boolean to filter inputs and outputs based on a given criteria. In addition to actions, processors can accept pre or post filters, which are applied to the input objects and the output objects respectively. The interface of a basic filter exports a conditional function expression as its property For example, an input connector can be passed through prefilter criteria to be used in the processor action and a transformed output from an action can be passed through a postfilter criteria to be placed in the output connector.

The building blocks 402 can be used to create an ITransformer<Ti,To> 412. For example, an ITransformer<Ti,To> 412 can extend an IEngine 406 class, apply a pre-filter, such as an IFilter 410 to filter inputs received, and IJob<Ti,To> 408 object to transform filtered inputs, and apply a post-filter such as an IFilter 410 to provide an output of the transformation. A transformer entity can be coupled to input and output connectors, such as IConnector 404 to create different types of composable processors.

Based on a cardinality of input and output connectors, a transformer entity can include three basic processor interfaces. For example, an IProcessor includes a transformer entity with a single input connector and a single output connector. A transformer entity can also include multiple input connectors and a single output connector in a second basic processor interface. The transformer entity can select an input from one of the multiple input connectors. In one example, a transformer entity with multiple input connectors and a single output connector can include an M:IMultiplexer<Ti,To>. A third basic processor interface can include a transformer entity having a single input connector and multiple output connectors. In one example, a transformer entity with a single input connector and multiple output connectors can include an D:IDemultiplexer<Ti,To> in which a single line input is transformed and passed to multiple output lines. In one example, each of the basic processor types receives an input of type Ti on the one or more input connectors and provides an output of type To on the one or more output connectors.

The basic processor types can be further cascaded, or composed, to provide additional levels of transformation while maintaining the basic interface structure of the basic processor types. In one example, a composite process CompositeProcess: IProcessor<Ti,To> can include a set of two or more connected processors that avail one input and one output to an environment to provide the same interface as a single IProcessor entity. For instance, a first processor having single input and single output can be cascaded with a second processor having a single input and single output. The first processor receives an input of type Ti, and the second processor provides an output of type To. The output of the first processor is connected to the input of the second processor in which the output type of the first processor, Tt, it the same as the input type of the second processor, Tt. In one example, this can be provided with an operation, such as Append, which can be provided as an extension method in a language such as C#, can be used to cased different types of composite units and composites to create new composites, such as:

IProcessor<Ti,Tt>.Append<Ti,Tt,To>(IProcessor<Tt,To>)
→IProcessor<Ti,To>

In another instance of a composite process CompositeProcess: IProcessor<Ti,To> that includes a set of two or more connected processors that avail one input and one output to an environment to provide the same interface as a single IProcessor entity includes an IDemultiplexer coupled to an IMultiplexer. In this instance a demultiplexer processor having single input and multiple outputs can be cascaded with a multiplexor processor having multiple inputs and single output. The demultiplexer processor receives an input of type Ti, and the multiplexer processor provides an output of type To. The outputs of the demultiplexer processor is connected to the inputs of the multiplexer processor in which the output type of the demultiplexer processor, Tt, is the same as the input type of the multiplexer processor, Tt. For example, IDemultiplexer<Ti,Tt>.Append<Ti,Tt,To>
(IMultiplexer<Tt,To>)→IProcessor<Ti,To>

A composite multiplexer CompositeMux: IMultiplexer<Ti,To> can include a set of a multiplexor and one or more connected processors that avail multiple inputs and one output to an environment to provide the same interface as a single IMultiplexer entity. In one example, the inputs of type Ti are provided to the multiplexer entity, and an output of type To is provided from a processor entity. The single output of the multiplexer entity is connected to the input of the processor entity, which provide and accept, respectively an intermediate type Tt. For example:

IMultiplexer<Ti,Tt>.Append<Ti,Tt,To>(IProcessor<Tt, To>)→IMultiplexer<Ti,To>

In another example, the inputs of type Ti are provided to a plurality of processors entities that each output an intermediate type Tt. The outputs of each of the processor entities are provided to the inputs of the multiplexer entity, which accepts type Tt. The output of the multiplexer entity provides a type To. For example, IList<IProcessor<Tt, To>>.Append<Ti, Tt, To> (IMultiplexer<Ti,Tt>)→IMultiplexer<Ti,To>

A composite demutiplexer CompositeDemux: IDemultiplexer<Ti,To> can include a set of a demultiplexer and one or more connected processors that avail a single input and multiple outputs to an environment to provide the same interface as a single IDeultiplexer entity. In one example, the multiple outputs of a demultiplexer entity are each connected to a processor entity. A single input of type Ti is provided to the demultiplexer entity, which provides a plurality of outputs of intermediate type Tt to each input of the plurality of processor entities. Each of the plurality of processor entities provides an output of type To. For example,
IDemultiplexer<Ti,Tt>.Append<Ti, Tt, To> (IList<IProcessor<Tt, To>>)→IDemultiplexer<Ti,To>

In another example, a single output of a processor entity is connected to the single input a demultiplexer entity. A single input of type Ti is provided to the processor entity, which provides a single output of intermediate type Tt to the input of the demultiplexer entity. The demultiplexer entity provides a plurality of outputs of type To. For example,
IProcessor<Tt, To>>.Append<Ti, Tt, To> (IDemultiplexer<Ti,Tt>)→IDemultiplexer<Ti,To>

Cascading processors can include various features. In an example of cascading different types of processes, as indicated above, connectors can be shared such as the output connectors of the leading processors are made to become the input connectors of the trailing processors, or processors being appended to the leading processors. Processors that are created for append can be missing input connectors, which will be provided from the leading processors during cascading. Further, composite processors can also be cascaded as compositions of composites.

In addition to cascading processors, other blocks or composites of blocks can be cascaded provided the output of the leading block is the same type as the input of the trailing block. In one example, IJob types can be cascaded provided they share an intermediate type. Similar to append, IJobs can be cascaded with an operation such as o-F to create a new action entity that represents the composition function. For example,
IJob<Ti,Tt>0.0f<Ti, Tt, To>(IJob<Tt, To>)→IJob<Ti, To>

The composite structure also permits parallelization on the job level of each processor and processor level parallelization. For example, each processor unit works on a corresponding one or more threads of control. Depending on the configuration of IActionExecutor interface in a framework, a set of tasks is created for each action (or cascaded action). If more than one task is created, the transformation process of the specific processor will be performed in parallel by the set of threads which consume from the same input connector and produce to the same set of output connectors. Also, multiple processors, regardless of whether they are interconnected, can be designed to work in parallel while coordinating with each other through interconnecting connectors, using a consumer-producer processing pattern.

The set of interfaces corresponding to the basic building blocks can be implemented differently in different environments. For instance, within a single computer environment, the connector may be implemented using a thread safe blocking queue implementation for moving objects in memory, while in a cloud service environment, such as that available under the trade designation Azure Services from Microsoft, Corp., connectors that expect inputs and outputs from other external services may use the queue-based implementation, with similar interface.

Additionally, the framework 400 can include a coordinator. A composite includes of a network of independent parallel processors that communicate through input-output connectors. An input given to the composite may result in a number of intermediate loads being processed by one more of the processors inside the composite. The coordinator keeps track of the number of items that are being processed at any time. A common coordinator is an object that is shared by all the processors and input connectors of a composite (outer most composite). When an input is received by each input connector, the events add the load count of the coordinator. After a processor gets an input from one of its connectors and completes processing it, it decrements the load count of the connector. This will keep the load count for the composite as the sum of the total number of input items waiting to be processed by one of the processors, and those that are being processed in any of the processors. Using this counter, if a user component of the composite requests the composite to finish processing, the coordinator can wait until the load count reaches 0 (zero). Additionally, the coordinator can also keep track of the time between increment and decrement operations between for inputs and may terminate if that time exceeds some given time span.

In one example, a root of an implements hierarchy can include IEngine 406, which can make use of an IActionExecutor interface and a Sate (enum) object. ITransformer 412 can extend IEngine 406 by adding dependency on IFilter 410 and IJob 408 interfaces. ITransformer 412 can also act as a common base interface for the processor interface of IProcessor, IMultiplexer, and IDemultiplexer, which extend the ITransformer interface 412 and can depend on the IConnector interface 404. Two additional interfaces can include IMultiInputChannel and ISingleInput Channel interfaces (not shown). These interfaces differentiate between a single input processor and a multiple input processor, in which the distinction can provide simplification to the composition of processes. For example, IProcessor and IDemultiplexer extend the ISingleInputChannel interface and the IMultiplexer extends the IMultiInputChannel interface.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein.

What is claimed is:

1. A method of a software framework, comprising:
defining a system of a plurality of independent software processors including compatible processors, the framework including interfaces implemented by classes to instantiate objects, the framework including composable components to extend classes and generate an abstract interface for generating the compatible processors; and
creating a composite processor from the compatible processors.

2. The method of claim 1 wherein the compatible processors include connectors.

3. The method of claim 1 wherein a processor in the plurality of independent software processors includes a composition.

4. The method of claim 3 wherein the composition includes an input connector, a transformation job, a state controlling engine, and an output connector.

5. The method of claim 4 wherein the composition further includes a prefilter and a postfilter.

6. The method of claim 1 wherein the composite processor is further composable.

7. The method of claim 1 wherein the composite processor accepts a plurality of inputs and provides a single output.

8. The method of claim 1 wherein the creating the composite processor from the compatible processors includes cascading the compatible processors having a common intermediate type.

9. The method of claim 8 wherein the output of a leading processor of the compatible processors is a type accepted by the input of a trailing processor of the compatible processors.

10. A system, comprising:
a memory device to store a set of instructions; and
a hardware processor to execute the set of instructions to:
define a system of a plurality of independent software processors including compatible processors in a software framework including interfaces implemented by classes to instantiate objects, the framework including composable components to extend classes and generate an abstract interface to generate the compatible processors; and
create a composite processor from the compatible processors.

11. The system of claim 10 wherein system provides cloud services.

12. The system of claim 10 wherein the software processors transform types.

13. The system of claim 12 wherein the composite processor includes a leading processor of the compatible processors provides an intermediate type accepted by the input of a trailing processor of the compatible processors.

14. The system of claim 10 wherein each of the software processors includes an engine to define the state of services.

15. The system of claim 10 wherein each of the software processors includes a job to transform an input.

16. The system of claim 10 wherein each software processor includes an input connector, a transformer, and an output connector.

17. A computer readable storage device, which is not a transitory propagating signal, to store computer readable instructions to control a processor to:
define a system of a plurality of independent software processors including compatible processors in a software framework including interfaces implemented by classes to instantiate objects, the framework including composable components to extend classes and generate an abstract interface to generate the compatible processors; and
create a composite processor from the compatible processors.

18. The computer readable storage device of claim 17 wherein the composite processor avails an input and output.

19. The computer readable storage device of claim 17 wherein the input is a first type and the output is of a second type.

20. The computer readable storage device of claim 17 wherein creating the composite processor includes composing entities from a plurality of interfaces.

\* \* \* \* \*